(12) United States Patent
Horn et al.

(10) Patent No.: US 6,682,794 B1
(45) Date of Patent: *Jan. 27, 2004

(54) POLYCARBONATE CONTAINERS

(75) Inventors: Klaus Horn, Dormagen (DE); Steffen Kühling, Meerbusch (DE); Ralf Hufen, Duisburg (DE); Rolf Lanze, Krefeld (DE); Michael Prein, Brasschaat (BE); Rainer Neumann, Krefeld (DE); Hermann Kauth, Krefeld (DE); Frieder Heydenreich, Düsseldorf (DE); Tony van Osselaer, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/070,205

(22) PCT Filed: Aug. 31, 2000

(86) PCT No.: PCT/EP00/08470

§ 371 (c)(1),
(2), (4) Date: Mar. 5, 2002

(87) PCT Pub. No.: WO01/19893

PCT Pub. Date: Mar. 22, 2001

(30) Foreign Application Priority Data

Sep. 13, 1999 (DE) .......................... 199 43 643

(51) Int. Cl.[7] .................. C08G 64/04; C08G 64/14
(52) U.S. Cl. ...................... 428/35.7; 264/523
(58) Field of Search .................. 428/35.7; 264/523

(56) References Cited

U.S. PATENT DOCUMENTS 6,395,864 B1 * 5/2002 Kuhling et al. ............. 528/196

FOREIGN PATENT DOCUMENTS

| DE | 24 39 552 | 2/1976 |
| DE | 42 27 272 | 2/1994 |
| EP | 0 736 558 A2 * | 10/1996 |
| WO | 00/39191 | 7/2000 |

OTHER PUBLICATIONS

**Bottenbruch, L.: "Kunststoff Handbuch Bd. 3/1 Polycarbonate, Polyacetale, Polyester, Celluloseester", 1992, Carl Hanser Verlag, München, Wien XP002154504 in der Anmeldung erwâhnt Seite 223–Seite 225, Seite 257–Seite 258, Seite 288–Seite 289.

** Database Chemabs Online! Chemical Abstracts Service, Columbus Ohio, US; retrieved from STN Database accession No. 115:137039/DN, Hcalpus XP002154505, Zusammenfassung & JP 03 109420 A (Idemitsu Petrochemical Co., Ltd.) May 9, 1991.

** Database WPI, Section Ch, Week 199403, Derwent Publications Ltd., London, GB; AN 1994–022980, XP002135668 & JP 05 331277 A (Teijin Chem Ltd), Dec. 14, 1993, Zusammenfassung.

* cited by examiner

Primary Examiner—Sandra M. Nolan
(74) Attorney, Agent, or Firm—Joseph C. Gil; Aron Preis; Gary F. Matz

(57) ABSTRACT

A container made of polycarbonate resin is disclosed. The container is characterized in that the polycarbonate is prepared by the phase interface process that is characterized in that the aqueous solution of an alkali salt of a bisphenol used, contains dissolved oxygen in an amount less than 150 ppb. The process for making the container is also disclosed.

10 Claims, No Drawings

POLYCARBONATE CONTAINERS

The present invention relates to polycarbonate containers, the production and use thereof.

The production of containers from polycarbonate moulding compositions is known. However, the containers exhibit differences in Yellowness Index (YI) and transmission.

Polycarbonates may be produced by the so-called phase interface process. In said process, dihydroxydiarylalkanes are reacted in the form of their alkali salts in aqueous solution with phosgene in the heterogeneous phase in the presence of inorganic bases such as sodium hydroxide solution and an organic solvent, in which the product polycarbonate is readily soluble.

More details relating to the phase interface process are disclosed in Schnell, "*Chemistry and Physics of Polycarbonates*", Polymer Reviews, Volume 9, Interscience Publishers, New York, London, Sydney 1964.

DE-A 4 129 545 describes a process for producing suspensions of bisphenolates. These may be used in the phase interface process to produce polycarbonate.

Containers made from polycarbonate are used as water bottles, for example. For aesthetic reasons, it is desirable to produce water bottles with a low Yellowness Index (YI) and high transmission. This is the object of the present invention.

This object is achieved by polycarbonate containers with improved light transmission, lower Yellowness Index and improved mechanical properties. These advantageous properties may be achieved if low-oxygen aqueous solutions of alkali salts of bisphenols are used in the production of the polycarbonate.

The present invention thus provides polycarbonate containers, wherein the polycarbonate is produced by the phase interface process and the aqueous solution of an alkali salt of a bisphenol used therein has a content of dissolved oxygen of less than 150 ppb, preferably less than 100 ppb, particularly preferably less than 50 ppb.

The polycarbonate is produced according to the invention in that the other raw materials apart from the aqueous solution of the alkali salt of bisphenol do not contain a noteworthy amount of oxygen. In addition, production is performed with the exclusion of oxygen, as described for example in DE-A 4 227 272.

For example, in a reaction vessel and tubular reactor configuration, the forced circulation loop and the tubular reactors are flooded and the reaction vessel is blanketed with nitrogen, so as to ensure the exclusion of oxygen.

In addition, the present invention provides the production of containers by injection blow moulding or extrusion blow moulding.

Injection blow moulding consists of a combination of injection moulding and blow moulding.

The process proceeds in three stages:
- injection moulding of the parison in the plastic temperature range of the polycarbonate
- inflation of the parison in the thermoplastic range of the polycarbonate (the core of the injection mould is simultaneously the blowing mandrel)
- stripping of the blow moulding and optionally air-cooling of the blowing mandrel (c.f. S. Anders, A. Kaminski, R. Kappenstein, "Polycarbonate" in Becker/Braun *Kunststoff-Handbuch*, Vol. 3/1, *Polycarbonate, Polyacetale, Polyester, Celluloseester*, Carl Hanser Verlag, Munich, Vienna 1992, pages 223 to 225).

In extrusion blow moulding, the pellets are generally melted using a single-screw extruder and moulded by a die to produce a self-supporting tube, which is then surrounded by a blow mould, which pinches the tube at its bottom end. Inside the mould, the tube is inflated, such that the tube is provided with the desired shape. After a period of cooling, the mould is opened and the moulding may be removed (c.f. F. J. Brinkschröder, "Polycarbonate" in Becker/Braun *Kunststoff-Handbuch*, Vol. 3/1, *Polycarbonate, Polyacetale, Polyester, Celluloseester*, Carl Hanser Verlag, Munich, Vienna 1992, pages 257 to 264.

For extrusion blow moulding it is advantageous to use a particularly pseudoplastic polycarbonate, so that a high level of melt stability is provided. Branched polycarbonates are particularly pseudoplastic.

To produce the polycarbonate for the containers according to the invention, aqueous solutions of an alkali salt of a bisphenol with a content of dissolved oxygen <150 ppb, preferably <100 ppb, particularly preferably <50 ppb are used, which may be obtained by reacting bisphenols with a dissolved oxygen content <10 ppb with an aqueous alkali hydroxide solution with a dissolved oxygen content <100 ppb under oxygen exclusion.

Preferred alkali salts are the sodium salts of bisphenols.

Bisphenols which may be used according to the invention are those which may be obtained by reacting aromatic hydroxy compounds which are not substituted in the p position and do not contain any second order substituents, such as cyano, carboxy or nitro groups, for example phenol, o- and m-cresol, 2,6-dimethylphenol, o-tert.-butylphenol, 2-methyl-6-tert.-butylphenol, o-cyclohexylphenol, o-phenylphenol, o-isopropylphenol, 2-methyl-6-cyclopentylphenol, o- and m-chlorophenol, 2,3,6-trimethylphenol, preferably phenol, o- and m-cresol, 2,6-dimethylphenol, o-tert.-butylphenol and o-phenylphenol. Phenol and ketones with at least one aliphatic group on the carbonyl function are particularly preferred, for example acetone, methyl ethyl ketone, methyl propyl ketone, methyl isopropyl ketone, diethyl ketone, acetophenone, cyclohexanone, cyclopentanone, methyl-, dimethyl- and trimethylcyclohexanones, which may also comprise geminal methyl groups, e.g. 3,3-dimethyl-5-methylcyclohexanone (hydroisophorone). Acetone, acetophenone, cyclohexanone and the homologues thereof bearing methyl groups are very particularly preferred. Acetone is the most preferable. By providing an inert nitrogen atmosphere throughout the production process, it is ensured that the residual content of dissolved oxygen in the bisphenols is less than 10 ppb.

Bisphenols which may be used according to the invention are, additionally: 3-(4-hydroxyphenyl)-1,1,3-trimethylindan-5-ol; 1,3-di-(2-(4-hydroxyphenyl)-2-propyl) benzene and 1,4-di-(2-(4-hydroxyphenyl)-2-propyl) benzene.

Bisphenols which are particularly preferred are 2,2-bis(4-hydroxyphenyl)propane (i.e. bisphenol A) and 1,1-bis(4-hydroxyphenyl)-3,3,5-trimethylcyclohexane.

The bisphenols or the mixtures thereof are preferably reacted, with the exclusion of oxygen (e.g. by providing an inert nitrogen atmosphere), with aqueous alkali hydroxide solution having a dissolved oxygen content <100 ppb, preferably <20 ppb. The concentration of alkali hydroxide solution is preferably such that the concentration of the resultant solution of an alkali hydroxide is as close as possible to the solubility limit, i.e. in the range of from 15 to 20 wt. %, preferably 16.5 to 18.5 wt. %. The molar ratio of alkali hydroxide to bisphenol is in particular from 1.8:1 to 2.5:1, preferably 1.9:1 to 2.4:1, particularly preferably 2.0:1 to 2.3:1. The bisphenol may be dissolved as a solid in the alkali hydroxide solution. However, it is preferable for it to be added to the alkali hydroxide solution directly as a melt at temperatures of from 20° C. to 90° C., preferably 30° C. to 70° C., without its having to pass through the solid state.

The virtually oxygen-free aqueous alkali hydroxide solution used to produce the aqueous solution of an alkali salt of a bisphenol may be produced by electrolysis. After production, the alkali hydroxide solution should be stored and transported under inert gas. For use in the process according to the invention, the concentration of alkali hydroxide solution obtained during electrolysis is generally reduced by dilution with virtually oxygen-free, fully deionised water. Oxygen is removed from the fully deionised water in a manner known in principle, e.g. catalytically, by degassing or by inert gas stripping.

The aqueous solution thus obtained of an alkali salt of a bisphenol exhibit particularly low colour indexes, which are naturally also dependent on the colour index of the bisphenol used. If a bisphenol is used which has a colour index <10 Hazen (ASTM D 1686), colour indexes of <1.5 Hazen, preferably <1.0 Hazen may be achieved.

The polycarbonates may be branched deliberately and in a controlled manner by the use of small amounts of branching agent. Examples of suitable branching agents are: phloroglucinol, 4,6-dimethyl-2,4,6-tri-(4-hydroxyphenyl)-2-heptene; 4,6-dimethyl-2,4,6-tri-(4-hydroxyphenyl) heptane; 1,3,5-tri-(4-hydroxyphenyl)benzene; 1,1,1-tri-(4-hydroxyphenyl)ethane; tri-(4-hydroxyphenyl) phenylmethane; 2,2-bis-[4,4-bis(4-hydroxyphenyl) cyclohexyl]propane; 2,4-bis(4-hydroxyphenylisopropyl) phenol; 2,6-bis(2-hydroxy-5'-methylbenzyl)-4-methylphenol; 2-(4-hydroxyphenyl)-2-(2,4-dihydroxyphenyl)propane; hexa-(4-(4-hydroxyphenylisopropyl)phenyl)orthoterephthalic acid ester; tetra-(4-hydroxyphenyl)methane; tetra-(4-(4-hydroxyphenylisopropyl)phenoxy)methane); $\alpha,\alpha',\alpha''$-tris-(4-hydroxyphenyl)-1,3,5-triisopropyl-benzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4''-dihydroxytriphenyl)methyl) benzene and in particular $\alpha,\alpha',\alpha''$-tris-(4-hydroxyphenyl)-1,3,5-triisopropylbenzene.

The branching agents or mixtures of branching agents which may optionally also be used, in an amount of 0.05 to 2 mol-% relative to the bisphenols used, may be introduced together with the bisphenols.

Chain terminators may be used according to the invention. The chain terminators used according to the invention are preferably phenols such as phenol, alkylphenols such as cresol and 4-tert.-butylphenol, chlorophenol, bromophenol, cumylphenol or mixtures thereof. Phenol, 4-tert.-butylphenol or cumylphenol are particularly preferred.

Chain terminators and branching agents may be added to the reaction mixture as a separate solution or together with the bisphenolate, wherein care must be taken to ensure that the solutions have the same low oxygen content according to the invention as the aqueous solution of an alkali salt of a bisphenol.

All the feed materials and solvents used for synthesis may be contaminated with impurities from the production and storage thereof, wherein the aim is to work with starting materials which are as clean as possible.

For the purposes of the present invention, containers may be used for packaging, storage or transportation of liquids, solids or gases. Containers are preferably used for packaging, storage or transportation of liquids (liquid containers) and are particularly preferably used for packaging, storage or transportation of water (water bottles).

For the purposes of the invention, containers are, for example, water bottles having a volume of from 0.1 l to 50 l, preferably 0.5 l to 50 l, very particularly preferably=3.8 l (1 gallon), 7.6 l (2 gallons), 11.4 l (3 gallons), 15.1 l (4 gallons) and 18.9 l (5 gallons). The bottles have an empty weight, for example, of from 0.1 g to 3000 g and preferably 50 g to 2000 g, water bottles having weights of from 650 g to 900 g being particularly preferred. The wall thicknesses of the bottles are from 0.5 mm to 5 mm, preferably 0.8 mm to 4 mm. For the purposes of the invention, water bottles are blow mouldings of a length of from 5 mm to 2000 mm, preferably 100 mm to 1000 mm. The water bottles have a maximum circumference of from 10 mm to 250 mm for example, preferably 50 mm to 150 mm and very particularly preferably 70 to 90 mm. For the purposes of the invention, water bottles are, for example, blow mouldings with a bottle neck of a length of from 1 mm to 500 mm, preferably 10 mm to 250 mm, particularly preferably 50 mm to 100 mm and very particularly preferably 70 to 80 mm. The wall thickness of the bottle neck varies, for example, between 0.5 mm and 10 mm, preferably 1 mm and 10 mm and very particularly preferably 2 mm and 7 mm. The diameter of the bottle neck varies, for example, between 5 mm and 200 mm, 10 mm to 100 mm being preferred and 45 mm to 75 mm being very particularly preferred.

The bottoms of the water bottles according to the invention have diameters of, for example, from 10 mm to 250 mm, preferably 50 mm to 150 mm and very particularly preferably 70 to 90 mm. For the purposes of the invention, water bottles are blow mouldings of any desired geometric shape, i.e. round, oval or polygonal and/or angular, having 3 to 12 sides. Round, oval and hexagonal shapes are preferred. The design of the bottles may be based on any desired surface texture. The surface textures are preferably smooth or ribbed. The bottles according to the invention may also comprise one or more different surface textures. Surface textures consisting of ribs and/or beads may extend around the circumference of the bottle with any desired spacing or with several different spacings. The surface textures of the bottles according to the invention may comprise roughened and/or incorporated textures, symbols, decorations, coats of arms, company names, trademarks, monograms, producer details, descriptions of materials and/or volume indications. The bottles according to the invention may comprise any desired number of handles, which may be arranged at the side, top and/or bottom. The handles may be external and/or incorporated into the bottle contour. The handles may be foldable or fixed. The handles may have any desired contour, i.e. they may be oval, round and/or polygonal/angular. The handles exhibit a length of from 0.1 mm to 180 mm, for example, preferably from 20 mm to 120 mm.

EXAMPLES

In the following Examples, the colour indexes were determined according to ASTM D 1686 by measuring absorption up to 400 nm over an irradiation length of 50 cm.

For the purpose of colorimetric characterisation, the polycarbonate sheets (60×40×4 $mm^3$) produced by extrusion and injection moulding were measured using the Data Color spectrophotometer Spektra Flash SF-500. Transmission measurement was performed according to DIN 5033 using polychromatic sample illumination with the measuring geometry D/0 for normal illuminant C/2.

Example 1

To produce 1.022 t/h of a 15% aqueous sodium bisphenolate solution, 867.5 kg/h of a 6.5% aqueous sodium hydroxide solution and 154.5 kg/h of BPA melt were combined continuously. The entire process was performed under an inert atmosphere of nitrogen. The 6.5% aqueous sodium hydroxide solution comprised an oxygen content of 10 ppb. The Hazen colour index of the resultant 15% aqueous sodium bisphenolate solution amounted to 0.5 Hazen. This sodium bisphenolate solution was used to produce polycarbonate by the phase interface process.

Comparative Example 1

To produce 1.022 t/h of a 15% aqueous sodium bisphenolate solution, 867.5 kg/h of a 6.5% aqueous sodium hydroxide solution and 154.5 kg/h of BPA melt were combined continuously. The entire process was performed under an inert atmosphere of nitrogen. The 6.5% aqueous sodium hydroxide solution comprised an oxygen content of 250 ppb. The Hazen colour index of the resultant 15% aqueous sodium bisphenolate solution amounted to 2 Hazen. This sodium bisphenolate solution was used to produce polycarbonate by the phase interface process.

Example 2

A polycarbonate with phenol end groups, a melt index (MFR) of 3 (measured according to ISO 1133) and a branching agent content of 0.3 mol % isatinbiscresol was produced from the sodium bisphenolate solution obtained in Example 1. This polycarbonate was processed in an extrusion blow moulding plant to produce a water bottle with a volume of 5 gallons. The water bottles were then assessed visually with regard to colour and transmission (see Table 1).

Comparative Example 2

A polycarbonate with phenol end groups, a melt index (MFR) of 3 (measured according to ISO 1133) and a branching agent content of 0.3 mol % isatinbiscresol was produced from the sodium bisphenolate solution obtained in Comparative Example 1. This polycarbonate was processed in the same plant and under the same conditions as in Example 2 to produce water bottles with a volume of 5 gallons. The water bottles were then assessed visually with regard to colour and transmission (see Table 1).

TABLE 1

|  | Comparative Example 2 | Example 2 |
|---|---|---|
| Colour | yellower than Example 2 | bluer than Comparison |
| Transmission | lower than Example 2 | more transparent than Comparison |

Example 3

A polycarbonate with phenol end groups, a melt index (MFR) of 3 (measured according to ISO 1133) and a branching agent content of 0.3 mol % isatinbiscresol was produced from the sodium bisphenolate solution obtained in Example 1. This polycarbonate was processed in an extrusion plant to produce sheets.

The extrusion plant was equipped with a screw of length 33D and a diameter of 75 mm and with venting. The melt temperature was 260° C. The sheet die was 600 mm wide. Colour specimens (60×40×4 mm³) were sawn from the sheets obtained and subsequently subjected to colorimetric measurement (Table 2).

Comparative Example 3

A polycarbonate with phenol end groups, a melt index (MFR) of 3 (measured according to ISO 1133) and a branching agent content of 0.3 mol % isatinbiscresol was produced from the sodium bisphenolate solution obtained in Comparative Example 1. This polycarbonate was processed in an extrusion plant to produce sheets. Colour specimens (60×40×4 mm³) were sawn from the sheets obtained and subsequently subjected to calorimetric measurement (Table 2).

TABLE 2

|  | Comparative Example 3 | Example 3 | Δ |
|---|---|---|---|
| 260° C. | | | |
| Yellowness Index | −30.39 | −29.80 | −0.59 |
| Transmission | 65.40 | 69.16 | −3.76 |

Example 4

A polycarbonate with phenol end groups, a melt index (MFR) of 3 (measured according to ISO 1133) and a branching agent content of 0.3 mol % isatinbiscresol was produced from the sodium bisphenolate solution obtained in Example 1. This polycarbonate was processed in an Arburg 270-210-25 mm injection moulding machine at a melt temperature of between 280 and 340° C. (+/−5° C.), a mould temperature of 90° C. (+/−3° C.), an injection rate of 40 mm/s and a cycle time of 43 s to produce sheets (60×40×4 mm³). The sheets obtained were then subjected to colorimetric measurement (Table 3).

Comparative Example 4

A polycarbonate with phenol end groups, a melt index (MFR) of 3 (measured according to ISO 1133) and a branching agent content of 0.3 mol % isatinbiscresol was produced from the sodium bisphenolate solution obtained in Comparative Example 1. This polycarbonate was processed in an Arburg 270-210-25 mm injection moulding machine under the same processing conditions as in Example 4 to produce sheets (60×40×4 mm³). The sheets obtained were then subjected to colorimetric measurement (Table 3).

TABLE 3

|  | Comparison Example | Example 4 | Δ |
|---|---|---|---|
| 280° C. | | | |
| Yellowness Index | −30.46 | −29.95 | 0.51 |
| Transmission | 65.55 | 69.32 | 3.77 |
| 300° C. | | | |
| Yellowness Index | −30.45 | −30.00 | 0.45 |
| Transmission | 65.46 | 69.36 | 3.90 |
| 320° C. | | | |
| Yellowness Index | −30.81 | −29.94 | 0.87 |
| Transmission | 65.72 | 69.41 | 3.69 |
| 340° C. | | | |
| Yellowness Index | −30.83 | −29.92 | 0.91 |
| Transmission | 65.87 | 69.38 | 3.51 |

The Examples show the advantageous properties of the containers according to the invention.

What is claimed is:

1. A polycarbonate container, wherein the polycarbonate is produced by the phase interface process and the aqueous solution of an alkali salt of a bisphenol used therein has a content of dissolved oxygen of less than 150 ppb.

2. The container according to claim 1, characterised in that the container is a liquid container.

3. The container according to claim 1, characterised in that the container is a water bottle.

4. The production of containers according to claim 1 by injection blow moulding.

5. The production of containers according to claim 1 by extrusion blow moulding.

6. A container comprising polycarbonate resin, said resin being the product of the phase interface process characterized that the aqueous solution of an alkali salt of a bisphenol entailed in said process contains dissolved oxygen in an amount less than 150 ppb.

7. A process for producing a container comprising (i) obtaining polycarbonate resin produced by the phase interface process wherein entailed is an aqueous solution of an alkali salt of a bisphenol, said solution containing dissolved oxygen in an amount less than 150 ppb, and (ii) molding a container by injection blow molding.

8. A process for producing a container comprising (i) obtaining polycarbonate resin produced by the phase interface process wherein entailed is an aqueous solution of an alkali salt of a bisphenol, said solution containing dissolved oxygen in an amount less than 150 ppb, and (ii) molding a container by extrusion blow molding.

9. In the process of producing by extrusion blow molding a container of polycarbonate resin, the resin being the product of the phase interface process, the improvement comprising using in said phase interface process an aqueous solution of an alkali salt of a bisphenol said solution containing dissolved oxygen in an amount less than 150 ppb.

10. In the process of producing by injection blow molding a container of polycarbonate resin, the resin being the product of the phase interface process, the improvement comprising using in said phase interface process an aqueous solution of an alkali salt of a bisphenol said solution containing dissolved oxygen in an amount less than 150 ppb.

* * * * *